United States Patent [19]

Barber

[11] 4,451,277

[45] * May 29, 1984

[54] PRODUCTION OF FLUID FERTILIZER FROM PHOSPHORUS FURNACE WASTE STREAM

[75] Inventor: James C. Barber, Florence, Ala.

[73] Assignee: James C. Barber and Associates, Inc., Florence, Ala.

[ * ] Notice: The portion of the term of this patent subsequent to May 17, 2000 has been disclaimed.

[21] Appl. No.: 428,840

[22] Filed: Sep. 30, 1982

Related U.S. Application Data

[60] Continuation-in-part of Ser. No. 301,378, Sep. 11, 1981, Pat. No. 4,383,847, which is a division of Ser. No. 223,122, Jan. 7, 1981, Pat. No. 4,372,929.

[51] Int. Cl.³ .................. C05B 11/10; C05B 7/00
[52] U.S. Cl. ................................ 71/36; 71/34; 71/43; 71/64.08; 423/310; 423/313; 423/323
[58] Field of Search ............ 71/43, 34, 64.08, 32, 71/52, 45, 25, 64.10, 36; 423/313, 310, 323, 167; 210/906, 907, 806

[56] References Cited

U.S. PATENT DOCUMENTS

| | | | |
|---|---|---|---|
| 3,084,029 | 4/1963 | Barber et al. | 423/323 |
| 3,428,430 | 2/1969 | Megar et al. | 423/323 |
| 4,372,929 | 2/1983 | Barber | 423/323 |
| 4,383,847 | 5/1983 | Barber | 71/43 X |

Primary Examiner—Kenneth M. Schor
Attorney, Agent, or Firm—James J. Brown

[57] ABSTRACT

Processes and compositions of matter are disclosed for the production of liquid fertilizers wherein wastewater from a phosphorus smelting furnace is incorporated in lqiuid fertilizer processes. The wastewater replaces water evaporated and the wastewater dissolves fertilizer salts. A serious water pollution problem is avoided when wastewater is incorporated in liquid fertilizers. The invention discloses a process for making orthophosphate suspension fertilizer wherein impure phosphoric acid is neutralized in the condensing system, water from the condensing system is bled off, and a suspending clay is added to produce orthophosphate suspension fertilizer. In this process, phosphorus sludge made at phosphorus furnaces is used to produce suspension fertilizer, and wastewater from phosphate smelting furnaces is recovered. New compositions of matter are disclosed. A process is disclosed for making phosphoric acid with low impurities content wherein phosphorus sludge is burned to make impure orthophosphoric acid and the impure acid is recycled to an agglomerating step in a process for making elemental phosphorus.

10 Claims, 5 Drawing Figures

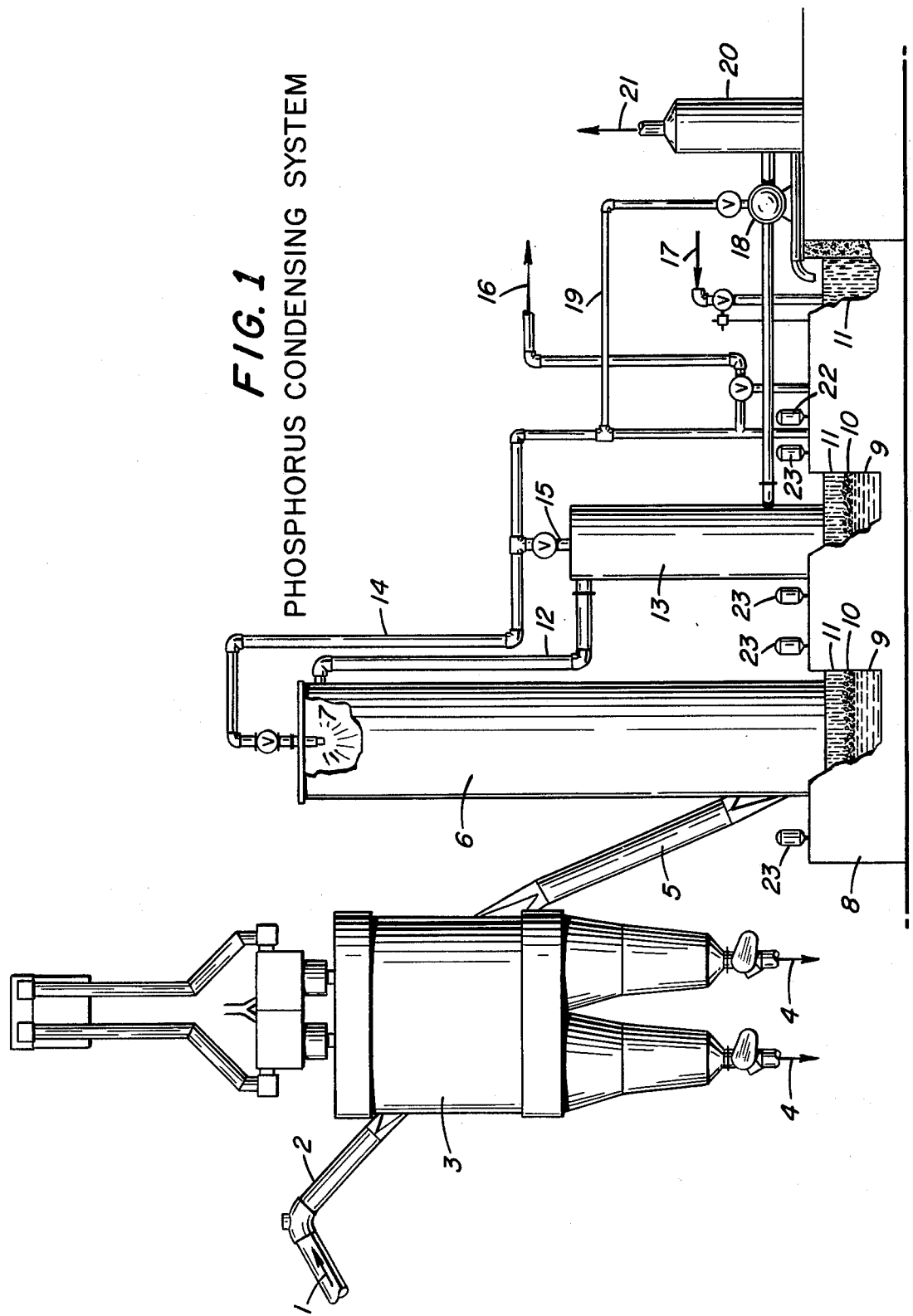

SOLUBILITY OF K₂SiF₆

SOLUBILITY OF Na₂SiF₆

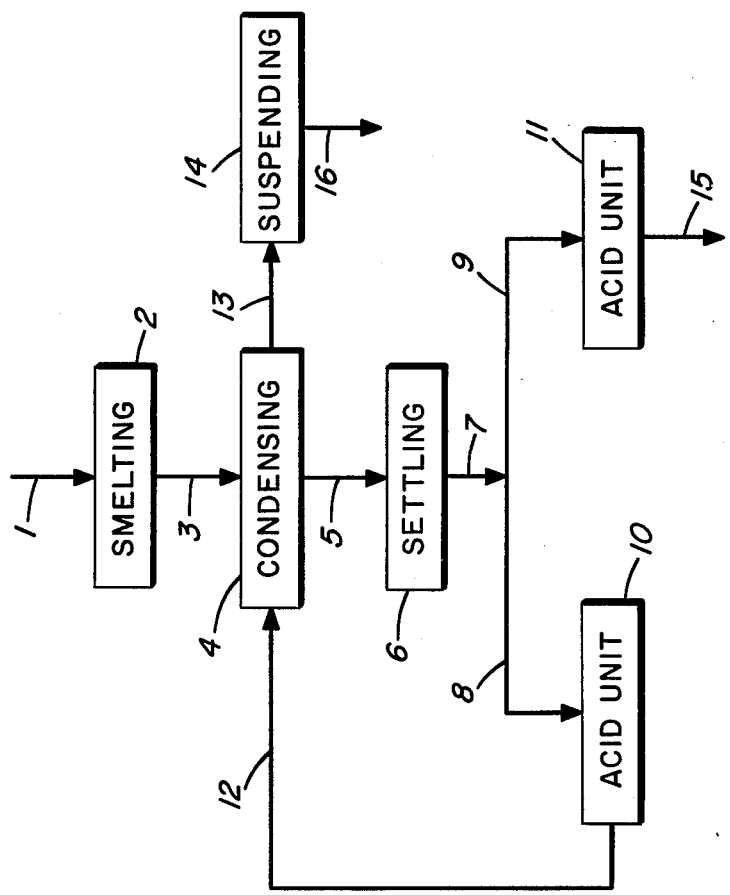

PRODUCTION OF FLUID FERTILIZER FROM PHOSPHORUS FURNACE WASTE STREAM

This application is a continuation-in-part of patent application Ser. No. 301,378 filed Sept. 11, 1981, entitled PRODUCTION OF FLUID FERTILIZER FROM PHOSPHORUS FURNACE WASTE STREAM now U.S. Pat. No. 4,383,847, which is a division of application Ser. No. 223,122 filed Jan. 7, 1981, entitled ENERGY CONSERVATION AND POLLUTION ABATEMENT AT PHOSPHORUS FURNACES now U.S. Pat. No. 4,372,929.

The technical information in this application supports the following two objectives.

Provide new processes for making liquid fertilizers wherein phosphorus-containing liquid wastes are incorporated in fertilizer mixtures.

Produce electric furnace phosphoric acid of high purity.

Patent application Ser. No. 301,378 contains much background information on energy conservation and waste recovery at phosphorus smelting furnaces used to produce elemental phosphorus. A liquid waste is discharged at the smelting furnaces, and the waste contains elemental phosphorus. Serious water pollution problems result unless the waste is given extensive treatment to remove the elemental phosphorus. The present application focuses on use of the phosphorus-containing waste to make liquid fertilizer. The present invention provides new processes for using phosphorus sludge produced at phosphorus smelting furnaces. This problem is closely related to disposal of wastewater containing elemental phosphorus.

The art of the present invention may be applied in the production of munitions wherein elemental phosphorus is the starting material for the production of binary nerve gas. Water wastes containing elemental phosphorus are potential pollutants at smelting furnaces. Also, water wastes are potential pollutants when the nerve gas is produced because elemental phosphorus must be kept under water, and water frequently is used in metering the element. The processes described herein provide environmentally acceptable disposal means for any of the aqueous wastes which contain elemental phosphorus, and the cost of disposal will compare favorably with other treatment methods.

Elemental phosphorus may become an important commercial product for export. The element may provide phosphorus nutrient to grow crops, and it is a source of energy when it is burned to produce phosphoric acid. Developing nations may be supplied with phosphorus nutrient and energy. One ton of elemental phosphorus provides as much nutrient as 4.4 tons of merchant-grade wet-process phosphoric acid; therefore, large savings in fuel for transportation would be realized if elemental phosphorus is shipped instead of wet-process phosphoric acid. Disposal of wastewater containing elemental phosphorus will seriously handicap any program to develop elemental phosphorus into an important product for export. The inevitable production of phosphorus sludge has been a serious handicap in the process for the manufacture of elemental phosphorus. The processes described in the present invention are expected to correct both problems.

Elemental phosphorus is produced by reacting a mixture of phosphate ore, silica rock, and reducing carbon in a smelting furnace called a submerged-arc electric furnace. The carbon combines with oxygen in the phosphate mineral releasing gaseous phosphorus. Many chemical reactions occur in the smelting furnace, and the technology is complex. The present patent application primarily involves recovery of elemental phosphorus from the furnace gas. Nevertheless, a full disclosure of the invention will require some explanation of the operation and chemistry of phosphate smelting.

The mineral in phosphate ore is fluorapatite and it is represented by the formula, $Ca_{10}(PO_4)_6F_2$. However, nearly all phosphate ores contain fluorapatite in a modified form wherein carbonate and fluorine replace some of the phosphate radical and some of the calcium is replaced by other metals. Most commercial phosphates are mineral concentrates which contain 80 to 90 percent apatite and 10 to 20 percent gangue material. The mineral concentrates are prepared by beneficiating raw phosphate ore. Unbeneficiated ores are sometimes used in phosphate smelting furnaces and the percentages of apatite will be less than 80 to 90 percent because the raw ore is contaminated with clay and silica.

The unsubstituted fluorapatite mineral contains 3.77 percent fluorine and 42.2 percent $P_2O_5$; its F to $P_2O_5$ weight ratio is 0.089. The F to $P_2O_5$ weight ratios in commercial phosphate ores may be as high as 0.14. The phosphate ores found in Tennessee and Florida are not highly substituted and they have a F to $P_2O_5$ weight ratio of 0.106. Unsubstituted fluorapatite must be heated to temperatures well above 2000° F. before significant fluorine is volatilized. No significant quantity of fluorine would be volatilized from a phosphorus smelting furnace if unsubstituted fluorapatite is the phosphate mineral in the ore. However, specific data are not available because unsubstituted fluorapatite does not occur in commercial phosphate ores. Fluorine in substituted fluorapatite begins to volatilize at temperatures well below 2000° F.

The data on the operation of phosphate smelting furnaces are inadequate to permit precise calculations of the quantity of fluorine volatilized. Data from one test have shown that 9 percent of the fluorine is volatilized from the smelting furnace when the F to $P_2O_5$ ratio in the phosphate was 0.08. Before the phosphate ore was calcined the F to $P_2O_5$ weight ratio was about 0.11; about 23 percent of fluorine was volatilized by calcining at about 2650° F.

Operating experience has shown that volatilization of fluorine from phosphate smelting furnaces increases with the F to $P_2O_5$ ratio in the ore. The volatilized fluorine causes operating problems in the phosphorus condensing system because insoluble fluosilicate salts are formed in condenser water. In the present invention processes are described to correct the condensing system operating problems when phosphate ores are smelted having a range of F to $P_2O_5$ weight ratios from 0.08 to 0.138.

Silica rock provides $SiO_2$ to combine with the CaO in phosphate ore to make calcium silicate slag. Phosphate ores contain some $Al_2O_3$, and $SiO_2$ combines with the $Al_2O_3$ to form calcium aluminate slag. The slag flows from the furnace as a high temperature liquid. About 18.8 percent of the electric energy input is lost in the molten slag, and this energy loss amounts to 7.7 million Btu per ton of phosphorus produced. Energy loss is greater for unbeneficiated phosphate ores than for beneficiated phosphate ores; the unbeneficiated ores contain gangue material which increases the quantity of slag produced. The percent $P_2O_5$ in the phosphate-silica rock mixture is a measure of the energy loss in the molten slag. Barber and Marks in *Journal of Metals*, December 1962, reported that a decrease of 1 percent in the $P_2O_5$ content of the phosphate-plus-silica mixture increases the electrical energy consumption about 2.5 percent. In the present invention phosphate smelting processes are disclosed wherein the $P_2O_5$ content of the phosphate-plus-silica rock mixture is increased to decrease the electric energy requirement for smelting.

Various condenser system arrangements are used to recover elemental phosphorus from furnace gas. The following two problems are common at all the production units:

Part of the condensed phosphorus is recovered as an emulsion comprised of water, solids, and discrete particles of elemental phosphorus. Recovery of the elemental phosphorus from the emulsion is costly, may be hazardous, and air and water pollution may be made worse by the recovery process.

Water inevitably comes in contact with elemental phosphorus. When this occurs, water becomes saturated with the element at a concentration of about 0.03 ppm. Also, phosphorus becomes suspended in the water as colloidal particles. Neither dissolved phosphorus nor colloidal suspended particles are easily removed from the water. Serious water pollution problems are caused by the discharge of the contaminated water.

PRIOR ART

Prior art given in divisional application Ser. No. 301,378 and original application Ser. No. 223,122 is incorporated in the present application. The following additional prior art is included.

Chemical Engineering Progress, Vol. 65, No. 6, June 1969, "Waste Effluent; Treatment and Reuse," J. C. Barber. The technical article gives a diagram of a phosphorus condensing system. A wastewater treatment method is described wherein the elemental phosphorus content of the water is about 0.05 ppm.

U.S. Pat. No. 2,039,297, May 5, 1936, "Separating PhosPhorus," H. A. Curtis. Elemental P is separated from hot gaseous mixtures produced in P reduction furnaces by continuously contacting the mixtures with a solution of $Ca(OH)_2:H_2O$ in a wt. ratio of 0.1-0.2-100 (lime:$H_2O$). The gaseous mixture which separates is principally CO saturated with $H_2O$ vapor. Any elemental P remaining can be removed by an adsorbent. The lime $H_2O$ containing condensed P, dust particles, and precipitated P oxidation products are withdrawn from the bottom of the condenser and permitted to stratify. The layers of lime $H_2O$, condensed P, and sludge are separated. The sludge is dried and incorporated with a P reduction furnace charging stock. The lime $H_2O$ is recycled to the condenser with $Ca(OH)_2$ added as needed.

U.S. Pat. No. 2,135,486, Nov. 8, 1938, "Separating Elemental Phosphorus from Impurities," L. H. Almond. Elemental P is separated from a mass containing elemental P and solid impurities, such as obtained by separating dust from phosphate reduction furnace gas or by indirect condensation of P from phosphate reduction furnace gas. Enough $H_2O$ is mixed with the mass to form a semifluid mixture. This mixture is fed continuously to a flash distillation zone maintained at $\sim 750°$-$800°$ F. The P and $H_2O$ in the mixture are flash distilled and separated from the solid impurities continuously. The solid impurities are withdrawn from the flash distillation zone continuously.

U.S. Pat. No. 3,084,029, Apr. 2, 1963, "Recovery of Phosphorus from Sludge," J. C. Barber, G. H. Megar, and T. S. Sloan. Phosphorus sludge formed during the production of P by smelting phosphate rock is fed to a vessel where centrifugal force is supplied. The centrifugal force causes P globules in the sludge emulsion to coalesce to liquid P which has a greater density than the impurities in the sludge. A $H_2O$ slurry containing $<\sim 7$ wt % P is removed as overflow, and a liquid underflow containing $>\sim 93$ wt % P is recovered. Treatment of the sludge with a small amount of a dispersant, such as NaOH, decreases viscosity and stickiness and thus permits the sludge to be pumped and handled more readily.

U.S. Pat. No. 3,113,839, Dec. 10, 1963, "Recovery of Phosphorus from Sludge," J. C. Barber, G. H. Megar, and T. S. Sloan. Phosphorus sludge formed during the production of P by smelting phosphate rock is treated by adding $<\sim 2$ wt parts of NaOH/1000 wt parts of sludge. This quantity is sufficient to raise the pH of the sludge from $\sim 3.0$ to $\sim 6.0$. The resulting mixture is agitated for $\sim 2$-6 days and then is burned to recover $P_2O_5$ vapor. Alternately, the treated sludge is subjected to centrifugal force to recover P liquid in the centrifuge underflow.

U.S. Pat. No. 3,136,604, June 9, 1964, "Recovery of Phosphorus from Sludge," J. C. Barber, G. H. Megar, and T. S. Sloan. Phosphorus sludge formed during the production of P by smelting phosphate rock is treated by adding $<1$ wt part of ammonium lignosulfonate/1000 wt parts of sludge to reduce the viscosity. Material sufficiently caustic to raise the sludge pH from $\sim 3.0$ to $\sim 6.0$ is added. The resulting mixture is agitated for $\sim 2$-6 days and burned to recover $P_2O_5$ vapor. Alternately, the treated sludge is subjected to centrifugal force and P recovered in liquid form.

U.S. Pat. No. 3,428,430, Feb. 18, 1969, "Method of Decreasing Sludge Formation in Phosphorus Furnace Sump," G. H. Megar and Arnett Hendrix. In the production of elemental P by reducing a phosphate rock blend in an electric furnace, offgases are scrubbed with sprays of $H_2O$ to condense the P vapor. Ammonium hydroxide is usually added to the condenser $H_2O$ to maintain the pH to 5.5-6.0. The mixture is run to a condenser sump where a layer of relatively pure molten P collects at the bottom. Above this is a layer of sludge comprised of P droplets, solid impurities, and $H_2O$. Above the sludge layer at a poorly-defined boundary is a $H_2O$ layer containing P droplets and solids in suspension. The furnace gases contain $SiF_4$ which reacts with the condenser $H_2O$ to precipitate hydrated $SiO_2$. The precipitated $SiO_2$ occludes P and thereby promotes sludge formation. Addition of aqueous $NH_4F$ to the condenser spray $H_2O$ to maintain a F:Si atomic ratio of $\sim 6$-10:1, preferably $\sim 6.5$:1, causes formation of soluble $(NH_4)_2SiF_6$ from all the $SiF_4$, preventing formation of $SiO_2$. Less sludge is formed, and the P is easier to recover in pure form.

U.S. Pat. No. 3,531,250, Sept. 29, 1970, "Utilization of Phosphate Sludge as Electric Furnace Feed," Arnulf Hinz, et al. In the usual method for the manufacture of alkali metal phosphates from wet process $H_3PO_4$ by neutralization with NaOH a precipitate of impurities is formed. The precipitate is separated as a sludge which contains 47-53% $P_2O_5$, dry basis. Because of its high content of combined water, and its small particle size, the sludge is difficult to work up into a commercial product such as fertilizer. A method is described for utilizing the sludge for the manufacture of elemental P by mixing it with phosphate rock and drying and agglomerating the mixture by any of the usual methods. The mixture should contain less than 15% sludge, dry basis. The sludge is an effective agglomeration agent, so other agents such as clay can be wholly or partially omitted. The agglomerates are stronger than usual.

U.S. Pat. No. 3,433,601, Mar. 18, 1969, "Separating Phosphorus from Gas Streams," H. M. Stevens. Elemental P is recovered from reduction furnace gases by cooling the mixture to a temperature below the dew point but above the melting point of P (60°–180° C.). The P is thereby condensed in liquid form. The liquid P is maintained in turbulent flow by recirculation to prevent sedimentation of solid impurities in the condenser and piping. Cooling is by indirect heat exchange with air or water. The method avoids the problems of "phossy water" and sludge in the usual wet method of condensing and collecting P.

U.S. Pat. No. 3,615,218, Oct. 26, 1971, "Recovery of Phosphorus from Electric Furnace Sludge," L. B. Post, R. E. Paul, and W. R. Crudup. During P manufacture when the P is condensed by cooling with $H_2O$, a slime containing 15–85% P forms as a boundary layer. The emulsion of P, $H_2O$, and fine solids is broken by stirring at 15°–45° with 3–5 wt parts $CS_2$/part of emulsion at a Reynolds No.$=(1\times 10^5)-(1\times 10^6)$ or a modified Reynolds No. (impeller No.)-$D^2N_{p/\mu}$ where D=diameter of the stirrer in cm, N=revolutions/sec of the stirrer, p=density in $g/cm^3$ (1.245 for $CS_2$), and $\mu$=viscosity in g/cm-sec ($4.956\times 10^{-3}$ for $CS_2$), until most of the P has dissolved in the $CS_2$. Thereafter the solution is filtered and P can be recovered by distillation. The stirring time can be calculated from $K=(T)-(N^{5/6}D^{5/3})$ were T=time in sec. Although stirring is ineffective when too slow, too vigorous stirring can lead to total emulsification (when K>600); K should be 100–600 when stirring for 2 min or less, 250–750 when stirring for ~10 min, and 325–825 when stirring for ~16 min. In an example, a mixer with a propeller stirrer (diameter 5.4 cm) was used to stir 140 wt parts of P slime containing ~40% P and 250 parts $CS_2$. Good separation was obtained by stirring for 2.5 min at 2000 rpm, 1.5 min at 8000 rpm, and 2.5 min at 8000 rpm, but total emulsification occurred when the mixture was stirred for 5.0 min at 8000 rpm.

U.S. Pat. No. 4,081,333, Mar. 28, 1978, "Phosphorus Distillation," W. S. Holmes, E. J. Lowe, and E. R. Brazier. A method and apparatus are described for distilling P from P mud formed when entrained P-containing solids are scrubbed from the waste gases of a thermal P plant. A distillation furnace is used which has: exposed Pb in the bottom of the heating zone; an aperture for insertion and removal of a vessel through a substantially horizontal channel; means for closing the aperture with a vapor-tight seal; and a conduit to conduct P vapor from the furnace to a condenser. An open thermally conductive vessel, or skip, containing P mud is placed in direct contact with the molten Pb at 330°–620°. The P is distilled from the mud as vapor and recovered. Thus, 415 kg of mud were melted in the skip and transferred when cold into the furnace containing molten Pb at 450°. The furnace lid was replaced and the furnace heated to raise the contents of the skip to 600°. During 14 hr heating time 144 kg of P was recovered; 37 kg of inert material remained in the skip. Solvent extractable P in the residue was <1 ppm.

U.S. Pat. No. 3,684,461, Aug. 15, 1972, "Phosphorus Recovery from Aqueous Sludge," Fritz Muller, Karl-Heinz Stendenbach, and Horst-Heinrich Weizenkorn. Elemental P is recovered continuously from waste $H_2O$ containing P sludge from the electrothermal production of P. The multi-step process entails filtration of the waste water using filter aids such as silicate slag, kieselguhr, or coke dust; centrifugation of the resulting filter cake; predrying the cake at up to 6 atm (gauge); drying and distilling the cake in multi-stages to vaporize the $H_2O$ at >100° and then distill the P at up to 380°; jointly condensing the $H_2O$ and P using filtrate, adjusted to pH 4–6 with $Ca(OH)_2$, recovered from the initial filtration step; and removing separately the $H_2O$ and P. Residue from the drying step is discharged as a powdery, nonflammable solid. The entire process is operated in the absence of air, the drying and distillation steps being maintained under an inert atm, such as N. It is preferable to incorporate a dust separation step ahead of the condensation zone with recycle of the recovered dust to one of the preceding drying zones. The major pieces of process equipment are a centrifugal filter, a reservoir having a mixer, at least two paddle blade screw driers in series, and an injection condenser. In an example employing kieselguhr as a filter aid, the filtrate contained 1 mg P/l. and the drier residue contained $P_2O_5$ 29.1, CaO 15.2, $SiO_2$ 40.8, F 3.7, and C 8.2%.

U.S. Pat. No. 3,436,184, Apr. 1, 1969, "Recovering Phosphorus from Sludge," J. A. Hinkebein. Addition of an $H_2O$-soluble inorganic hexavalent oxy-chromium compound to sludge formed in a P condenser sump causes the P to settle to the bottom in a coalesced layer. Thus, sludge decanted from a P condenser sump containing 34% liquid P, 13% solids, and 53% $H_2O$ was fed at 45 gal/hour to a mixing tank stirred with a blade rotating at 105 rpm. An aqueous 1% $CrO_3$ solution was also fed to the tank at 90 gal/hour. The treated sludge containing 4.66% P and 89.73% $H_2O$ was continuously withdrawn as overflow. Liquid P containing 0.29% $CrO_3$ and 0.005% benzene-insoluble matter was withdrawn from the bottom of the tank. Optionally, the $CrO_3$ can be added to the condenser $H_2O$.

U.S. Pat. No. 3,515,515, June 2, 1979, "Recovering Phosphorus from Sludge," J. A. Hinkebein. The P content of sludge produced in condensing P vapor is decreased by the presence of an oxidizing agent such as $CrO_3$ in the condenser liquor.

U.S. Pat. No. 3,743,700, July 3, 1973, "Recovery of Phosphorus from Sludge," C. P. Orr. Phosphorus sludge obtained as a byproduct in the production of elemental P by the electric furnace method is admixed with sufficient elemental P to provide a P:dirt ratio of at least 75:25 and continuously dried at >100 to <8 wt % $H_2O$. A dry, fluid sludge is produced that is readily recycled to the electric furnace.

U.S. Pat. No. 3,852,050, Dec. 3, 1974, "Recovery of Phosphorus," Chao Hsiao and L. B. Horton. Solids-free gas containing $P_4$, CO, and $H_2O$, from an electric reduction furnace, is passed upward through a primary condenser where the gas is contacted countercurrently with a $H_2O$ spray at ~60° to condense a portion of the $P_4$ as a liquid. The resulting mixture of $H_2O$ and liquid $P_4$ is passed to a settling zone for recovery of the $P_4$. Effluent gas from the primary condenser is then passed upward through a secondary condenser in which $H_2O$ at 4° is sprayed countercurrently down the center and along the inside walls of the condenser to quench rapidly the remaining $P_4$ vapor into solid particles containing entrapped $H_2O$. The resulting slurry of solid $P_4$ particles in H₂O is fed to the settling zone for recovery as molten P₄.

Proceedings of the 35th Industrial Waste Conference, Purdue University, May 13, 14, and 15, 1980, "Development of a Wastewater Management System for an Elemental Phosphorus Production Plant," John H. Koon, Gary M. Davis, Paul D. Knowlson, and Edward F. Smith, Hooker Chemicals and Plastics Corporation, Columbia, Tenn. 38401. Hooker makes elemental phosphorus and phosphoric acid at Columbia, Tenn. Prior to the beginning of the investigation Hooker treated wastewater with lime, storage in on-site ponds, and recycle of water to process uses. The system was effective in dry weather but the ponds overflowed in wet weather. The plant is located on 110 acres of land, the rainfall is 52 inches per year, and annual evaporation is 31 inches. A program was undertaken to segregate uncontaminated storm water runoff from the plant water system, convey the combined storm water and process waste streams to storage ponds, and to develop a treatment system capable of processing these waste streams for reuse or for discharge to a surface waterway. The following constituents were to be controlled in the plant discharge.

Total suspended solids
Total phosphorus
Fluoride
Elemental phosphorus
pH

Elemental phosphorus in wastewater varied between 50 and 350 micrograms per liter. Elemental phosphorus removal methods investigated were: chemical coagulation; alkaline hydrolysis; air oxidation; chlorine oxidation; precoat filtration; and carbon adsorption. None showed promise with the possible exception of carbon adsorption. The following treatment scheme was tried in a pilot plant.

Chemical precipitation and sedimentation employing lime and polymer addition.
Granular media filtration.
Granular activated carbon sorption.

Overall pilot-plant results are as follows:

|  | Plant water | Clarifier effluent | Filter effluent | Carbon column effluent | Overall removal, % |
|---|---|---|---|---|---|
| Elemental phosphorus, μ/l. | 152 | 122 | 99 | 0.13 | 99.9 |
| Phosphorus, mg/l as P |  |  |  |  |  |
| Total | 179 | 52.0 | 44 | 38 | 78.8 |
| Ortho | 149 | 18.6 | 14.4 | 13.6 | 88.1 |
| Fluoride (mg/l) | 157 | 73.7 | 62.6 | 54.8 | 65.1 |
| pH | 7.1 |  |  | 9.0 |  |

BRIEF DESCRIPTION OF THE DRAWINGS

FIG. 1 is a diagram of a Phosphorous Condensing System.

FIG. 4 is a flow diagram showing a process for making phosphoric acid.

FIG. 5 is a flow diagram showing a process for making orthophosphate suspension fertilizer.

Figure 3:
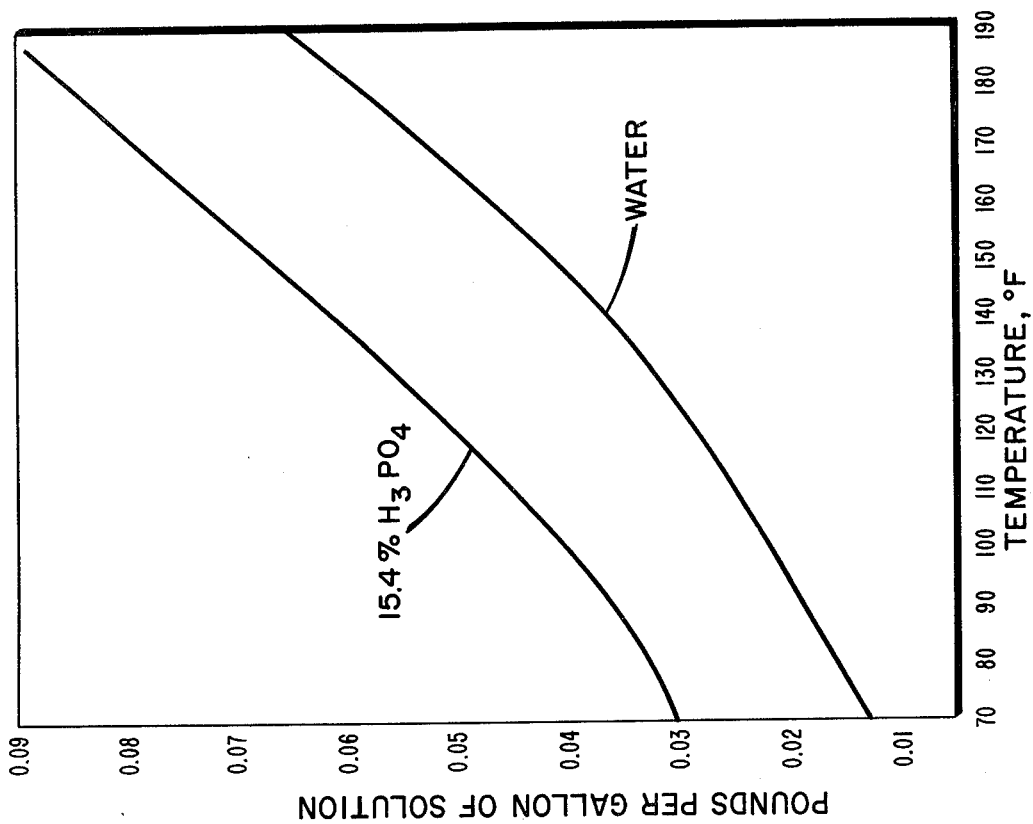
FIG. 3 is a graph similar to FIG. 2 of K₂SiF₆.

Furnace gas is shown as 1 in FIG. 1. The gas is anhydrous and it contains about 24.9 pounds of elemental phosphorus per 1000 cubic feet of noncondensable gas at STP. The gas mixture is conducted through line 2 to electrostatic precipitator 3. Dust is discharged at 4 at a rate of 0.07 ton per ton of elemental phosphorus produced. Treated gas from the precipitator flows through pipe 5 to the bottom of an adiabatic condenser 6. Gas is saturated with water by spraying water into the gas by means of water spray 7. Gas is cooled adiabatically from 600° to 145° F. Mixture of water and liquid phosphorus flows down adiabatic condenser 6 to collecting sump 8 wherein liquid phosphorus 9 collects as a bottom layer; an emulsion of solid particles, water, and phosphorus droplets collect as layer 10; and water 11 is top layer in sump 8. Boundary between water 11 and phosphorus sludge 10 is not clearly defined. Gas leaves the adiabatic condenser through pipe 12 and enters tubular condenser 13. Water overflows a baffle in sump 8. Baffle is not shown in FIG. 1. Water is recirculated from sump 8 to condenser 6 through pipe 14. Pump 22 pumps water to spray 7. A stream of the recirculating water enters tubular condenser 13 through pipe 15 and is sprayed into tubes by spray nozzles not shown. A stream of the recirculating water is bled off at 16 and makeup water is added at 17. The concentration of fluosilicate salts in the recirculating water is kept below saturation by adding the fresh water. Gas and water are exhausted by pump 18 as water is added to the pump through line 19. Gas flows to entrainment separator 20 and the composition of the gas at 21 is as follows.

|  | Percent by volume | |
|---|---|---|
|  | Dry | Wet |
| CO₂ | 0.7 | 0.7 |
| O₂ | 0.1 | 0.1 |
| CO | 87.3 | 85.9 |
| H₂ | 7.9 | 7.7 |
| N₂ | 2.3 | 2.3 |
| CH₄ | 1.1 | 1.1 |
| C₂H₂ | 0.6 | 0.6 |
| H₂O | — | 1.6 |
|  | 100.0 | 100.0 |

Pumps 23 transport phosphorus and phosphorus sludge to storage tanks through pipelines not shown.

Air leaks into the furnace gas through feed chutes and openings in the furnace roof and gas offtake. Some of the phosphorus is oxidized by the oxygen in the inleakage forming P₂O₅. Some of the P₂O₅ is collected in the electrostatic precipitator; the remaining P₂O₅ is entrained; in the gas stream and is carried into the adiabatic condenser. The P₂O₅ combines with water forming phosphoric acid.

Fluorine volatilizes from the phosphorus furnace as SiF₄ and this compound combines with water in the adiabatic condenser forming fluosilicic acid, H₂SiF₆.

Both phosphoric and fluosilicic acids corrode steel. It is common practice to neutralize the recirculating water at the adiabatic condenser with an alkali to control corrosion. The recirculating water is normally neutralized to a pH in the range of 5.5 to 6.0. When either NaOH or Na₂CO₃ is used to neutralize the water, sodium fluosilicate, Na₂SiF₆, is formed. When the concentration of Na₂SiF₆ reaches saturation the salt precipitates as a tenacious scale which accumulates in spray nozzles and pumps. Consequently, water is bled from the recirculating stream at the adiabatic condenser and fresh water is added to keep the concentration of Na$_2$SiF$_6$ below saturation.

Figure 2:
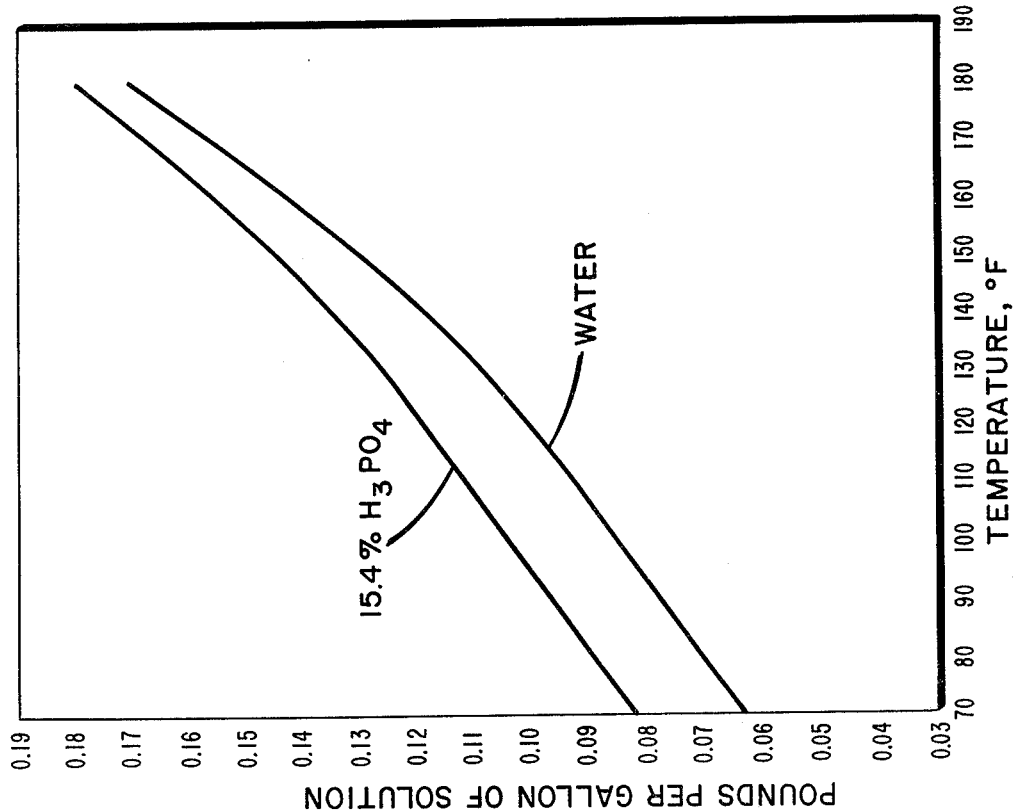
FIG. 2 is a graph of solubility of Na₂SiF₆ in water and phosphoric acid solution.

FIG. 2 gives the solubility of Na$_2$SiF$_6$ in water and in a 15.4 percent phosphoric acid solution. Concentrations must be kept below the values shown to prevent serious operating problems from scaling of Na$_2$SiF$_6$. Note that Na$_2$SiF$_6$ is more soluble in phosphoric acid than in water, and higher concentrations of Na$_2$SiF$_6$ can be tolerated in the unneutralized condenser water. However, the condensing system must be constructed or corrosion-resistant materials if the water is unneutralized.

Sodium and potassium compounds are present in phosphate ores. Both sodium and potassium substitute for calcium in the apatite molecule. These alkali metals are constituents of clay, a substance frequently used as a binder for the agglomeration of phosphate ores. Both sodium and potassium volatilize from the phosphorus furnace and enter the condensing system. Much of the potassium is removed from the gas stream by the electrostatic precipitator; the precipitator dust contains about 16 percent K$_2$O. Nevertheless, some potassium enters the adiabatic condenser and combines with H$_2$SiF$_6$ forming K$_2$SiF$_6$. The solubility of K$_2$SiF$_6$ in water and in 15.4 percent phosphoric acid solution is shown in FIG. 3. Note that K$_2$SiF$_6$ is much less soluble in both water and phosphoric acid than is Na$_2$SiF$_6$.

Ammonia is frequently used to neutralize condenser water, and ammonium fluosilicate will be formed. This salt is more soluble than either sodium or potassium fluosilicate. Problems of scale formation from the precipitation of ammonium fluosilicate are rare. However, water must be bled from the recirculating stream to prevent scaling by Na$_2$SiF$_6$ and K$_2$SiF$_6$. Electrostatic precipitators are not completely effective for the removal of particulates from the furnace gas. The gas entering the adiabatic condenser contains particulates which become suspended in the recirculating water. The suspended particulate concentration will increase to the point that the recirculating water will become slimy and the water spray will not effectively cool the gas by the adiabatic process. Water must be bled from the recirculating stream to prevent such high concentrations of suspended solids. The bleedoff rate must be increased if the phosphate ore contains clay: more sodium and potassium fluosilicate salts accumulate in the condenser water; clay contains micron size particles which become suspended in the furnace gas; and solids accumulate in the condenser water at a greater rate.

Water bled from the condensing system contains nutrients, fluorine, and elemental phosphorus as pollutants. The water is saturated with elemental phosphorus at a concentration of about 0.03 ppm. Also, the elemental phosphorus is present as colloidal particles suspended in the water as described by Isom in *Journal of Water Pollution Control Federation,* volume 32, No. 12, pages 1312-16 (1960). The elemental phosphorus concentration should be reduced to the detection limit for analysis, or about 0.5 ppb, if the effluent is discharged as a waste. Few treatment methods are capable of reaching such low concentrations, and treatment is costly. In patent application Ser. No. 301,378, I disclosed processes wherein the bleedoff water may be incorporated in orthophosphate fertilizer suspensions without costly treatment. The present invention discloses additional processes for incorporating the wastewater in fluid fertilizer processes.

The prior art reveals several processes for treating phosphorus sludge to recover high quality phosphorus. In most of the processes, phosphorus is only partially separated from the solid impurities, or fuel must be burned to volatilize elemental phosphorus and water leaving a phosphorus-free residue. Elemental phosphorus is recovered by condensing the volatilized gases. Some silicon tetrafluoride, SiF$_4$, volatilizes from the phosphorus sludge and contaminates the condensed phosphorus. All of the processes are too costly.

A process is disclosed in the present invention wherein phosphoric acid with low impurities content is produced from phosphorus sludge. FIG. 4 is a diagram which illustrates the process. Phosphate ore 31 and ground phosphate 32 are added to agglomerator 33. Impure orthophosphoric acid is added through line 46. Agglomerates 34 are anhydrous after being indurated in 33. The agglomerated phosphate ore is smelted in 37. Reducing carbon 35 and silica rock 36 are added. Phosphorus furnace gas 38 flows to a condensing system 39 wherein a mixture of phosphorus and phosphorus sludge 40 is recovered and pumped to a vessel 11 for settling. High quality phosphorus is recovered by settling in 41 and is pumped through line 42 to acid unit 44 wherein 47 is phosphoric acid product with low impurities content. Phosphorus sludge separated in 41 is pumped through line 43 to acid unit 45 wherein orthophosphoric acid with high impurities content is recycled through line 46 to the agglomerator 33.

When phosphate ores are smelted in an electric furnace, dust particles are entrained by the gases generated in the furnace. Also, some inorganic compounds are volatilized from the furnace. At some plants electrostatic precipitators are provided to remove particulates from the gas stream. However, the precipitators are not completely effective and some of the particulates remain suspended in the gas stream after treatment. The electrostatic precipitators are not designed to remove volatilized inorganic compounds, although some of these compounds condense in the precipitators and cause operating problems. Particulates and volatilized inorganic compounds are removed from the gas stream in the condensing system. The particulates collect with phosphorus particles and water to form an emulsion having a specific gravity range of about 1.3 to 1.5. Liquid elemental phosphorus has a specific gravity of 1.7. Phosphorus sludge is readily separated from liquid phosphorus by settling, and the liquid phosphorus layer is high purity.

Phosphoric acid is normally produced by burning the material in a stainless steel combustion chamber. A coating of polymerized phosphoric acid condenses on the inside surface of the combustion chamber and prevents the stainless steel from corroding. The phosphorus burned must be nearly anhydrous to prevent the phosphoric acid coating from hydrolyzing to orthophosphoric acid. Humidity in air and the small amount of water entrained and dissolved in good quality phosphorus provide enough water to form polymerized phosphoric acid needed to protect the stainless steel combustion chamber. Phosphorus sludge contains too much water to burn in a stainless steel combustion chamber.

In FIG. 4, item 44 is an acid unit described in the publication, *Industrial and Engineering Chemistry,* volume 59, No. 6, June 1967, pages 18-28, "A High Temperature Superphosphoric Acid Plant," H. Y. Allgood, F. E. Lancaster, Jr., J. A. McCollum, and J. P. Simpson. The combustion chamber is constructed of A.I.S.I. Type 316 stainless steel. High quality phosphorus must be burned in the unit to prevent corrosion of the stainless steel.

The acid unit indicated 45 in FIG. 4 was described in the publication, *Corrosion,* volume 14, August 1958, "Corrosion Problems in the Manufacture of Phosphoric Acid from Elemental Phosphorus," J. C. Barber. The combustion chamber is constructed of graphite blocks. High quality phosphorus or phosphorus sludge may be burned in the acid unit.

When the acid is recycled to the agglomerator, as disclosed in the present invention, impurities are refined in the smelting furnace and all of the product is clear phosphoric acid with low impurities content. All of the product may be highly concentrated phosphoric acid, if this product is desired.

FIG. 5 is a diagram which discloses a process for making suspension fertilizer from the impure orthophosphoric acid. A mixture of phosphate ore, reducing carbon, and silica in 51 is smelted in furnace 52. Furnace gas 53 is treated in condensing system 54, and mixture of phosphorus and phosphorus sludge 55 is transported to settling tanks 56. Material is pumped from tanks 56 through line 57 with phosphorus sludge transported through line 58 to acid unit 60. Phosphorus sludge is burned in a combustion chamber constructed of graphite blocks, and orthophosphoric acid is produced which is recycled through line 63 to the condensing system 54 wherein acid is neutralized by ammmonia from a line not shown in the diagram. Water containing ammonium phosphate in a saturated solution and as crystallized suspension is transported through line 63 to a tank 64 equipped with an agitator not shown. A suspending clay is added to the tank by a feeder not shown in the diagram. Orthophosphate suspension fertilizer is produced and is pumped from the tank through line 66. High quality phosphorus from settling tanks 56 is transported through line 59 to acid unit 61. The acid unit is equipped with a stainless steel combustion chamber. Phosphoric acid with low impurities content is removed through line 65.

A process is disclosed in FIG. 5 wherein both phosphorus sludge and excess condenser water are used to make suspension fertilizer. Air used to burn the phosphorus sludge in acid unit 10 is adjusted so as to produce an acid mixture containing $P_2O_5$ and $P_2O_3$. Neutralization of the acid mixture with ammonia results in the formation of small sized ammonium phosphate crystals suitable for use in making suspension fertilizers. Heat generated by neutralization of orthophosphoric acid with ammonia is removed by a tubular cooler in the condensing system.

In order that those skilled in the art may better understand how the present invention can be practiced, the following examples are given by way of illustration but not necessarily by way of limitation.

EXAMPLE I

Phosphate ore was mined in middle Tennessee and was beneficiated by washing, an operation which removed most of the clay. The beneficiated ore had the following dry basis analysis.

| Constituent | Percent |
| --- | --- |
| $P_2O_5$ | 25.9 |
| CaO | 36.8 |
| $SiO_2$ | 22.7 |
| $Fe_2O_3$ | 3.1 |

-continued

| Constituent | Percent |
| --- | --- |
| $Al_2O_3$ | 4.0 |
| F | 2.8 |
| $K_2O$ | 0.8 |
| MgO | 0.3 |
| $MnO_2$ | 0.3 |
| $Na_2O$ | 0.6 |
| $CO_2$ | 1.5 |
| $SO_2$ | 1.7 |
| Organic C | 0.2 |
| Combined water | 1.5 |

The $F/P_2O_5$ ratio in the ore was 0.108 as compared with 0.089 in fluorapatite. Analysis indicates moderate substitution of fluorine for phosphate in the fluorapatite molecule. The phosphate ore was agglomerated by nodulizing at a temperature of 2650° F. All of the $CO_2$, $SO_2$, organic C, and combined water was volatilized; 25 percent of the fluorine came off. As a result, the $P_2O_5$ content of the phosphate was increased by a factor of 1.06, and the nodulized phosphate had the following composition.

| Constituent | Percent |
| --- | --- |
| $P_2O_5$ | 27.5 |
| CaO | 39.0 |
| $SiO_2$ | 24.1 |
| $Fe_2O_3$ | 3.3 |
| $Al_2O_3$ | 4.2 |
| F | 2.23 |
| $K_2O$ | 0.8 |
| MgO | 0.3 |
| $MnO_2$ | 0.3 |
| $Na_2O$ | 0.6 |

The $F/P_2O_5$ ratio was 0.081 indicating that all of the substituted fluorine and about 9 percent of the fluorapatite fluorine has been volatilized. Nodules, silica rock, and metallurgical coke were charged to a smelting furnace operating at a powerload of 13,400 kW. Furnace gas was treated in an electrostatic precipitator to remove suspended particulates and the gas was cooled in an adiabatic condenser by a stream of recirculating water. A 4.4 percent soda ash solution was added to the recirculating water to maintain the pH at 5.5 and prevent corrosion. The rate of soda ash addition was 3 pounds per ton of elemental phosphorus produced. A stream of water was bled off the condensing system and fresh water was added to control the concentration of suspended solids in the recirculating stream. Water was bled at a rate of 73 pounds per ton of phosphorus produced. Fluosilicates did not precipitate in the condensing system. A fluorine balance showed that 91.4 percent of the fluorine charged was in the slag and 9.1 percent was in phosphorus sludge, making 100.5 percent accounted for. The water bled off contained about 0.16 percent fluorine and about 1.7 percent $P_2O_5$. Losses of F and $P_2O_5$ in the water were 0.1 pound of F per ton of elemental phosphorus and 1.2 pounds $P_2O_5$ per ton. The water contained about 0.4 percent suspended solids.

The water bled off was added to the first-stage ammoniator of a three-stage process for the production of orthophosphate suspension fertilizer to replace fresh water normally used to make the fertilizer. Suspension fertilizer was made at a rate of 392 pounds per ton of elemental phosphorus produced.

EXAMPLE II

Phosphate ore was mined in middle Tennessee and was beneficiated by washing as in example I. A mixture was prepared which comprised two parts beneficiated ore to one part unbeneficiated ore, and the mixture contained a substantial amount of clay. The mixture was briquetted wherein clay was the binder. The briquets were calcined in a nodulizing kiln as in example I but the temperature was in the range of 1865° to 2200° F. In this temperature range, fluorapatite crystals begin to form and agglomerates become indurated by crystal interlocking. Six percent of the fluorine was volatilized during calcination. Chemical analysis of the calcined briquets was as follows.

| Constituent | Percent |
| --- | --- |
| $P_2O_5$ | 26.6 |
| CaO | 37.5 |
| $SiO_2$ | 20.0 |
| $Fe_2O_3$ | 4.1 |
| $Al_2O_3$ | 2.6 |
| F | 2.6 |

The $F/P_2O_5$ weight ratio in the calcined briquets was 0.098, indicating about half of the substituted fluorine had been volatilized.

The calcined briquets, silica rock, and metallurgical coke were charged to a smelting furnace operating at a powerload of 6580 kW. Furnace gas was treated in an electrostatic precipitator to remove suspended particulates and the gas was cooled in an adiabatic condenser. The condenser water was neutralized with soda ash solution; 6 pounds of soda ash was required per ton of elemental phosphorus produced. Water was bled from the condensing system at a rate of 1900 pounds per ton of elemental phosphorus recovered. The water bled off contained about 0.28 percent fluorine. The water was added to the first-stage ammoniator of a three-stage process for the production of orthophosphate suspension fertilizer to replace fresh water. The suspension fertilizer was made at a rate of 10,800 pounds per ton of phosphorus produced.

EXAMPLE III

A mixture of Florida hard rock phosphate, silica rock, and metallurgical coke was smelted in a phosphorus furnace operating at 8050 to 8390 kW powerload. The Florida hard rock was in lump form and required no agglomeration for use in the phosphorus furnace. Analysis of the material charged to the furnace was as follows.

| Constituent | Percent |
| --- | --- |
| Moisture | 0.7 |
| $P_2O_5$ | 35.7 |
| CaO | 51.5 |
| $SiO_2$ | 2.6 |
| $Fe_2O_3$ | 1.1 |
| $Al_2O_3$ | 0.8 |
| $CO_2$ | 3.2 |
| F | 3.9 |

The $F/P_2O_5$ ratio was 0.109 indicating moderate substitution in the fluorapatite. The rate of fluorine volatilization during smelting was calculated to be 0.07 ton per ton of phosphorus produced. The furnace gas was treated in an electrostatic precipitator to remove suspended particulates and the gas was cooled in an adiabatic condenser. Precipitator operation with Florida hard rock was poor because deposits accumulated on the wires and frames, and these deposits were not removed by steaming or shaking the wires and frame. The deposits caused electrical grounding of the precipitator. After about a month's operation it was necessary to shut down and remove the deposits manually, at which time it was found that crystallized projections on the wires and frames caused the precipitator grounding. Composition of the deposits was as follows.

| | Analysis, % | |
| --- | --- | --- |
| Constituent | Deposits on wires in second pass | Deposit on second pass frame |
| Ignition loss | 9.6 | 20.4 |
| $P_2O_5$ | 35.1 | 44.0 |
| CaO | 0.2 | 0.2 |
| $SiO_2$ | 50.1 | 32.2 |
| F | 0.3 | 0.3 |
| $K_2O$ | 0.3 | 0.8 |
| $Fe_2O_3$ | 0.2 | 4.2 |
| $Al_2O_3$ | 0.0 | 0.0 |

The crystalline material deposited in the electrostatic precipitator was not identified. It was anticipated that sodium fluosilicate scale would precipitate from condenser water because the $F/P_2O_5$ ratio in the phosphate exceeded the ratio for fluorapatite. Consequently, a water-cooled coil was inserted in the condenser sump and the coil was observed to determine whether or not fluosilicates were precipitating. Makeup water was added on the basis of observations of the coil. Heated water was added to the gas exhauster to avoid problems of fluosilicate deposition in this unit.

The condenser water was neutralized with soda ash solution, and about 438 pounds was required per ton of elemental phosphorus produced. Water was bled off at a rate of 6500 pounds per ton of phosphorus produced, and the $P_2O_5$ content of the water was about 0.2 percent. Suspension fertilizer was produced at a rate of 37,100 pounds per ton of elemental phosphorus produced.

EXAMPLE IV

No test data were obtained when phosphoric acid solution was used instead of a neutralized solution to condense elemental phosphorus. However, data are available to calculate the results that would be obtained.

Sixty-eight percent BPL phosphate ore from Florida was agglomerated by a low-temperature process wherein orthophosphoric acid was used to agglomerate the material; the phosphoric acid was neutralized with ground 68 BPL phosphate ore, and the agglomerates were indurated at about 300° F. The composition of the ore was as follows.

| Constituent | Percent |
| --- | --- |
| $P_2O_5$ | 31.1 |
| CaO | 46.6 |
| $Fe_2O_3$ | 2.59 |
| $SiO_2$ | 7.3 |
| F | 3.3 |

The ratio of F to $P_2O_5$ was 0.106, and 16 percent of the fluorine was in the substituted form. Phosphate ore required to produce a ton of elemental phosphorus was about 9.5 tons and about 0.050 ton of F was volatilized from the furnace per ton of elemental phosphorus produced. The quantity of fluorine volatilized from the furnace was too large for successful operation of an electrostatic precipitator and none was used. The calculated quantity of soda ash needed to neutralize the fluosilicic acid in the condensing system was 92.9 pounds per ton of elemental phosphorus produced, and about 3 pounds of soda ash was needed to neutralize the phosphoric acid, making a total consumption of 95.9 pounds of soda ash per ton of phosphorus produced.

From FIG. 2, solubility of sodium fluosilicate is given as 0.12 pound per gallon of solution in water and 0.135 pound per gallon for 15.4 percent $H_3PO_4$. These are solubilities at 140° F. Therefore, bleedoff water rate will be 6,690 pounds per ton of phosphorus when the solution is neutral and 5,430 pounds of water if a 15.4 percent $H_3PO_4$ solution is used in the condensing system. The bleedoff water was added to the first-stage ammoniator of a three-stage process for the production of orthophosphate suspension fertilizer. The suspension fertilizer was made at a rate of 38,200 pounds per ton of phosphorus produced when the condensing water was neutralized. When an acid solution is used for condensing, the suspension fertilizer is produced at a rate of 31,000 pounds per ton of phosphorus produced.

EXAMPLE V

Computations similar to those in example IV were made in the present example. It was assumed that the condenser water was neutralized with KOH to form $K_2SiF_6$. Sixty-seven pounds of KOH was required per ton of phosphorus.

Solubility of $K_2SiF_6$ is 0.036 pound per gallon in water and 0.061 pound per gallon in 15.4 percent $H_3PO_4$. The water bleedoff rate was 44,700 pounds per ton of elemental phosphorus. The bleedoff water was added to the first-stage ammoniator of a three-stage ammoniation process for the production of suspension fertilizer. The quantity of suspension fertilizer produced was 256,000 pounds per ton of phosphorus produced.

EXAMPLE VI

Computations similar to those in example IV were made in the present example. It was assumed that the condenser water was neutralized with soda ash, as in example IV, and the water bleedoff rate was 6,690 pounds per ton of phosphorus when the condenser water was neutral. The bleedoff rate was 5,430 pounds when a 15.4 percent $H_3PO_4$ solution was used.

The bleedoff water was used to make a 10-30-0 base fertilizer suspension in accordance with the following formulation.

| Ingredients | Lbs. for 1 ton of base suspension |
| --- | --- |
| Monoammonium phosphate fertilizer, 11-52-0 | 1,154 |
| Anhydrous ammonia | 90 |
| Clay | 30 |
| Water | 726 |
| Total | 2,000 |

When the condenser water was neutralized, 18,400 pounds of the base 10-30-0 suspension fertilizer was produced. When the condenser water was a 15.4 percent phosphoric acid solution, 15,000 pounds of the base solution was produced.

EXAMPLE VII

Phosphate ore having a F to $P_2O_5$ weight ratio of 0.106 and a $P_2O_5$ content of 31.6 was smelted in a phosphorus furnance. Silica rock was added to flux the mixture, and metallurgical coke was the reducing carbon. The furnace gases were treated in an adiabatically cooled condenser wherein recirculating water was neutralized to a pH of 5.5 by the addition of anhydrous ammonia. The ammonia requirement was 30 pounds per ton of elemental phosphorus produced. The water bleedoff rate was 930 pounds per ton of elemental phosphorus. The water bled off was used to make 10-30-0 base suspension fertilizer in accordance with the formulation given in example VI. The quantity of the base suspension fertilizer made was 2,560 pounds per ton of phosphorus produced.

EXAMPLE VIII

This example is similar to example VII except that phosphate ore having a F to $P_2O_5$ ratio of 0.11 and a $P_2O_5$ content of 36.2 percent was smelted. The ammonia requirement was 44 pounds per ton of phosphorus produced and the bleedoff water rate was 1,350 pounds per ton. The bleedoff water was used to make 10-30-0 base suspension fertilizer at a rate of 3,720 pounds per ton of elemental phosphorus.

EXAMPLE IX

A mixture of phosphate ore, silica rock, and low volatile bituminous coal was smelted in a phosphorus furnace wherein the coal was reducing carbon. The coal had the following dry basis analysis.

Fixed carbon: 79.4%
Volatile matter: 14.6%
Ash: 6.0%

An adiabatic condenser was used to condense the phosphorus in the furnace gas. The condenser water contained 80 to 125 ppm of phenol. The F to $P_2O_5$ weight ratio in the phosphate ore was about 0.095, condenser water was neutralized with ammonia, and water was bled off at a rate required to keep the concentration of ammonium fluosilicate below saturation. The bleedoff water was used to make 10-30-0 base suspension fertilizer wherein the bleedoff water replaced fresh water normally added to dissolve monoammonium phosphate.

EXAMPLE X

Furnace gas was treated in a condensing system illustrated in FIG. 1, comprising an electrostatic precipitator, an adiabatically cooled condenser, a tubular condenser, and exhausters to pump the gas. Water was bled from the condensing system to control the concentration of suspended solids in the water and to control the concentration of fluorine. The bleedoff water was combined with water from phosphorus storage tank overflow, phosphorus tank washouts, phosphorus tank car washouts, bleedoff water from phosphorus metering systems, and water from gasline washouts. Water from all these sources contained elemental phosphorus, and the water accumulated at a rate of 10,800 pounds per ton of phosphorus produced; its suspended solids content was 3900 ppm and the elemental phosphorus content was 1850 ppm. The contaminated water was clarified in a gravity-type clarifier wherein 92 percent of the suspended solids and 93 percent of the elemental phosphorus were recovered as phosphorus sludge. About 48 pounds of elemental phosphorus was recovered per ton of elemental phosphorus produced. Clarified water contained about 130 ppm of elemental phosphorus and about 310 ppm of suspended solids. The clarified water was reused in the system, but a stream of the clarified water was bled off, mixed with cooling water, further clarified by settling in a 14-acre pond, treated with air to oxidize elemental phosphorus, and discharged as an effluent. The effluent contained 0.3 to 0.5 ppm of elemental phosphorus. The stream of clarified water was bled off at a rate needed to control the fluorine concentration of the recirculating water at the adiabatic condenser which depended on the F to $P_2O_5$ ratio in the phosphate ore fed to the smelting furnace.

EXAMPLE XI

Bleedoff water from a phosphorus condenser was centrifuged in a commercial centrifuge unit. The bleedoff water contained 1105 ppm of elemental phosphorus and the concentration was reduced to 27 ppm by centrifuging. Underflow from the centrifuge contained 95.6 percent of the elemental phosphorus in the bleedoff water.

EXAMPLE XII

Gravitational settling tests were made to clarify the water. Thirty parts per million of Purifloc 601, a cationic flocculent, and 1 part per million of Purifloc 501, an anionic flocculent, was added to the water. The water contained 44 ppm of elemental phosphorus before settling and the phosphorus content of supernatant liquor was 1 ppm. The supernatant liquor was clear but it was not water white.

EXAMPLE XIII

Phosphate ore was smelted in electric furnaces to produce elemental phosphorus. The furance gas was cooled and a mixture of water, elemental phosphorus, and solid impurities was collected in sumps under the condensers. Liquid phosphorus having a higher density than the other materials settled on the bottom of the sump. Phosphorus sludge, comprised of particles of phosphorus, particles of solid impurities, and water, collected as a layer on top of the phosphorus. Condenser water collected on top of the phosphorus sludge. Liquid phosphorus and phosphorus sludge were pumped daily to an empty storage tank having a capacity of 150 tons of phosphorus. Plant production rate was about 109 tons per day of elemental phosphorus. The mixture in the storage tank was allowed to settle for approximately 24 hours. Levels of the phosphorus layer and phosphorus sludge layer were measured and samples of the two materials were taken and analyzed. The quantity and quality of the two materials were determined. Phosphorus was pumped to storage by a submerged pump through a sight glass, and when phosphorus sludge appeared in the sight glass, pumping was diverted to phosphorus sludge storage. Measurements showed that 92 percent of the elemental phosphorus was high quality product containing 99.6 percent phosphorus. Eight percent was recovered as phosphorus sludge which varied widely in composition.

EXAMPLE XIV

A test was made at a 15,000-kW furnace equipped with an electrostatic precipitator and an adiabatic condenser. The purpose of the test was to compare the quality and quantity of phosphorus sludge with and without using the electrostatic precipitator. For the test without a precipitator, electric current was turned off but the furnace gas continued to flow through the precipitator tubes. When the precipitator was operating, 12.2 percent of the phosphorus produced was collected as phosphorus sludge, and the sludge contained 35.7 percent phosphorus. Without operation of the precipitator, 27.8 percent of the phosphorus produced was collected as sludge, but the sludge contained 52.2 percent phosphorus. With the precipitator operating, the phosphorus contained 98.8 percent of elemental phosphorus; without the precipitator operating, the phosphorus contained 96.4 percent elemental phosphorus. Smelting of phosphate ore with a high $F/P_2O_5$ ratio will preclude operation of electrostatic precipitators because crystallized deposits accumulate on the frames and wires and cause electric grounding. Larger amounts of phosphorus sludge must be processed if precipitators are not used.

EXAMPLE XV

Phosphorus separated from phosphorus sludge by settling was burned in a stainless steel phosphoric acid unit to produce concentrated acid of high purity. Following is an analysis in percent by weight.

| Constituent | Percent by weight |
|---|---|
| $P_2O_5$ | 79.9 |
| Fe | 0.001 |
| Al | 0.001 |
| Cr | None found |
| Ni | 0.001 |
| Mo | None found |
| As | 0.001 |
| Pb | 0.0002 |
| $SiO_2$ | 0.001 |
| CaO | 0.004 |
| F | 0.01 |
| Cl | None found |
| S | 0.002 |

The metal/$P_2O_5$ ratio was $95 \times 10^{-6}$, and the $F/P_2O_5$ ratio was $125 \times 10^{-6}$. The high quality phosphoric acid can be used in making animal feed supplements and in preparing other high quality phosphate chemicals. Also, highly concentrated phosphoric acid was produced which had the $P_2O_5$ distributed among various species of phosphoric acids as shown below.

| | Percent |
|---|---|
| Ortho | 17.5 |
| Pyro | 40.1 |
| Tripoly | 22.1 |
| Tetrapoly | 11.5 |
| Pentapoly | 5.6 |
| Hexapoly | 2.1 |
| Heptapoly | 1.2 |

EXAMPLE XVI

Phosphorus was produced at a smelting furnace wherein 8 percent of the elemental phosphorus was in the phosphorus sludge and 92 percent was in the high quality phosphorus. The phosphorus sludge was comprised of 80 percent elemental phosphorus and 20 percent benzene-insoluble impurities on a dry basis. The benzene-insoluble impurities had the following composition.

|   | Percent |
|---|---|
| $P_2O_5$ | 32 |
| F | 23 |
| CaO | 9 |
| $SiO_2$ | 7 |
| $Fe_2O_3$ | 6 |
| $Al_2O_3$ | 3 |
| C (by difference) | 20 |
| Total | 100 |

The phosphorus sludge was burned in a combustion chamber. The combustion chamber was a graphite electrode which had been bored out. The hydrator was a graphite block chamber, and a stainless steel venturi scrubber removed particulates from the gases. Phosphoric acids produced in the combustion chamber, hydrator, and venturi scrubber were combined, and the concentration of the combined acid was 53 percent $P_2O_5$. The acid contained the following percentages of impurities.

|   | Percent |
|---|---|
| F | 0.1 |
| CaO | 0.5 |
| $SiO_2$ | 0.4 |
| $Fe_2O_3$ | 0.3 |
| $Al_2O_3$ | 0.2 |
| C | 1.1 |
| Total impurities | 2.6 |

The water used to hydrate the $P_2O_5$ to form acid was clarified condenser water. The quantity was 340 pounds per ton of elemental phosphorus produced.

The impure phosphoric acid produced from phosphorus sludge was used to agglomerate phosphate ore in accordance with the following formulation.

330 parts 68% BPL phosphate ore
42 parts ground phosphate
63 parts impure phosphoric acid produced from phosphorus sludge
85 parts water Approximately 4,000 pounds of water per ton of phosphorus was required to agglomerate the phosphate ore. Clarified condenser water can be used to provide the agglomerating water. Impure acid produced from phosphorus sludge was therefore recycled to the phosphorus furnace.

EXAMPLE XVII

Phosphorus sludge was processed in a phosphoric acid production unit wherein the sludge was injected into a horizontal chamber called a vaporizer. Sufficient air was put into the vaporizer to burn about 20 percent of the elemental phosphorus. The remainder of the elemental phosphorus and the water were vaporized; they flowed to a vertical combustion chamber through a duct. Additional air was put in the combustion chamber to burn the phosphorus. The gases were hydrated by water sprays in another vertical chamber. The gases were conducted to a venturi scrubber by means of a duct. Phosphoric acid was recovered in the combustion chamber, hydrator, and venturi scrubber. The combined acid contained 58 percent $P_2O_5$ and 3 percent $P_2O_3$.

The phosphoric acid mixture was used to make diammonium phosphate fertilizer by the vacuum crystallization method. Much of the $P_2O_3$ in the phosphoric acid remained dissolved in the mother liquor and the concentration of $P_2O_3$ exceeded 3 percent. Excessive nucleation of diammonium phosphate crystals occurred. A crystal slurry was obtained which could not be centrifuged because of the fineness and gelatinous character of the solids. The crystal slurry had properties desired for the preparation of suspension fertilizers. When the $P_2O_3$ concentration of the mother liquor was in the range of 1.5 to 3 percent and about 8 percent of $SO_4$ ions were present, the diammonium phosphate crystals were larger and thicker and they had properties desired for diammonium phosphate as crystal fertilizer.

EXAMPLE XVIII

In this example a process is described for treating phosphorus-containing waste at a plant which converts elemental phosphorus into other phosphorus chemicals. However, the total process has not been carried out as described.

Elemental phosphorus was received in tank cars and pumped to storage tanks. A layer of water was kept over the phosphorus to prevent it from burning. Phosphorus was pumped to metering tanks for processing into the chemicals. Water displaced phosphorus in the metering tanks; water rate was measured and its rate was controlled in order to measure and control the phosphorus feed rate.

When water comes in contact with elemental phosphorus the water becomes saturated with the element, and colloidal particles of phosphorus become suspended. The water was reused in a closed system, but fresh makeup water was added at a rate needed to keep the maximum concentration of elemental phosphorus at 100 ppm. Water was bled from the system as makeup water was added. The water bled from the system was treated with a flocculent and clarified by settling. The elemental phosphorus content of the supernatant water was less than 1 ppm and it was returned to the recirculating water system. Underflow from the settling operation was used to prepare a 10-30-0 base suspension fertilizer wherein ammonia, solid ammonium phosphate fertilizer, and the underflow were mixed to dissolve the monoammonium phosphate. A precipitate formed from impurities in the monoammonium phosphate, and a suspending clay was added to keep the precipitate in suspension.

EXAMPLE XIX

The integrated process described below has not been carried out, but technical data were obtained on most of the steps comprising the process.

A mixture of phosphate ore, silica rock, and reducing carbon was smelted in an electric furnace. The furnace gas was treated in a condensing system wherein most of the elemental phosphorus was recovered in an adiabatic condenser. A mixture of liquid phosphorus and phosphorus sludge was pumped to a settling tank to separate the two materials. The phosphorus sludge was converted to orthophosphoric acid in a production unit comprised of a vaporizer, graphite combustion chamber, carbon block hydrator, and a stainless steel venturi scrubber. The product was a mixture of phosphoric and phosphorous acids; the mixture contained 53 percent $P_2O_5$ and 3 percent $P_2O_3$. In addition, the acid contained 1.5 percent inorganic impurities and 1.1 percent carbon. The acid was black; it was added to the condenser water and this water was neutralized to a pH of about 6 by ammonia. Small sized ammonium phosphate crystals precipitated in the recirculating water and were suspended by the turbulence in the recirculating water. A stream of the recirculating water was bled off and pumped to a tank equipped with an agitator. Prior to filling the tank a gelled clay was put in. The mixture was agitated and pumped to storage for sale as a suspension fertilizer.

Liquid phosphorus separated from the phosphorus sludge was converted to highly concentrated phosphoric acid with low impurities content. The metals/$P_2O_5$ ratio in the acid was about $70 \times 10^{-6}$, and the $F/P_2O_5$ ratio was about $130 \times 10^{-6}$.

Following are claims for the present invention.

I claim:

1. A process for the production of fluid fertilizer comprising the steps of:
   (a) smelting a mixture of phosphate ore, reducing carbon, and silica rock in a submerged arc electric furnace wherein a phosphorus-containing gas is evolved;
   (b) treating phosphorus-containing gas in an electrostatic precipitator to remove suspended dust;
   (c) cooling the phosphorus-containing gas in an adiabatic condenser wherein water is (i) sprayed into the condenser to contact the phosphorus containing gas to condense phosphorous from the gas, (ii) collected in a sump, and (iii) recirculated to the condenser;
   (d) adding an alkaline material to the recirculating stream of water of step (c) to maintain the pH in the range of 5.5 to 6.0;
   (e) adding fresh water to the recirculating stream;
   (f) bleeding off a stream of water from the recirculating stream;
   (g) clarifying the bleedoff water from step (f);
   (h) adding the clarified bleedoff water from step (g) to an orthophosphate suspension fertilizer process comprised of two or three stages of ammoniation wherein clarified bleedoff water is added to the first-stage ammoniator to replace employment of fresh water.

2. A process for the production of fluid fertilizers as in claim 1 wherein clarified bleedoff water from step (g) is added to an orthophosphate suspension fertilizer process comprised of two stages of ammoniation wherein clarified bleedoff water is added to the first-stage ammoniator.

3. A process for the production of fluid fertilizers as in claim 1 wherein the $F/P_2O_5$ weight ratio of the fluorapatite in the phosphate ore in step (a) is in the range of 0.080 to 0.095.

4. A process for the production of fluid fertilizers as in claim 1 wherein the reducing carbon in step (a) is low volatile matter content bituminous coal.

5. A process for the production of fluid fertilizers as in claim 1 wherein precipitator dust from step (b) is added to an orthophosphate suspension fertilizer process comprised of three stages of ammoniation wherein the precipitator dust is added to the first-stage ammoniator.

6. A process for the production of fluid fertilizers as in claim 1 wherein bleedoff water in step (f) is clarified in step (g) by centrifuging.

7. A process for the production of fluid fertilizers as in claim 1 wherein bleedoff water in step (f) is clarified in step (g) by treating the water with a flocculent and removing the suspended solids by gravitational settling.

8. A process for the production of fluid fertilizers as in claim 1 wherein the alkaline material added in step (d) to maintain the pH in the range of 5.5 to 6.0 is ammonia.

9. A process for the production of fluid fertilizers as in claim 1 wherein the alkaline material added in step (d) to maintain the pH in the range of 5.5 to 6.0 are potassium compounds.

10. A process for the production of fluid fertilizers as in claim 1 wherein phosphoric acid is added to the recirculating stream of water in step (d).

* * * * *